Nov. 19, 1957  C. ARCHAMBAULT  2,813,459
SPECTACLES WITH VARIABLE LIGHT TRANSMISSION
Filed April 7, 1954
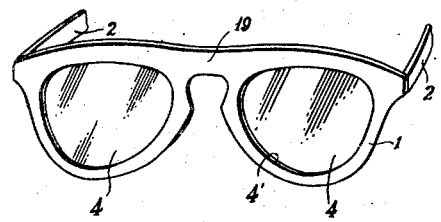
*Fig. 1*
*Fig. 2*
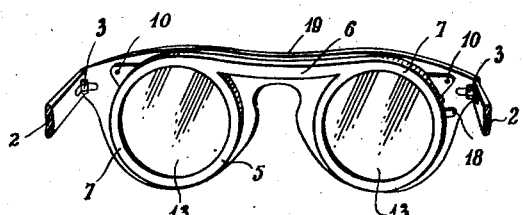
*Fig. 3*
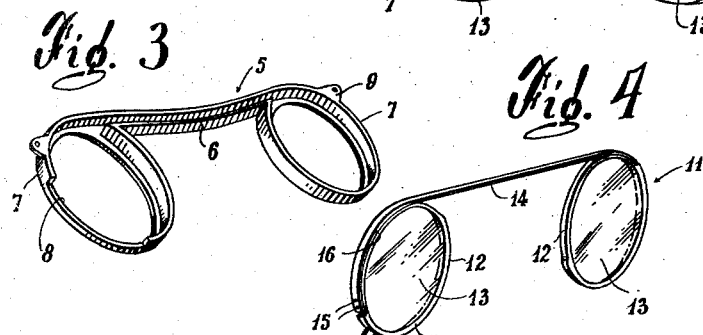
*Fig. 4*
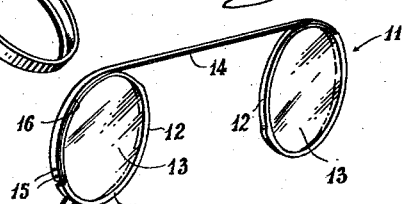
*Fig. 5*
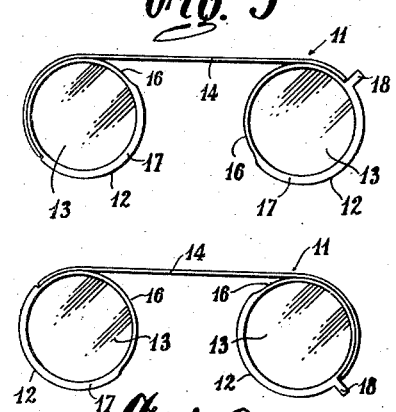
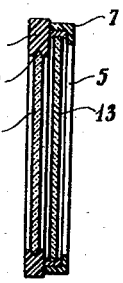
*Fig. 7*
*Fig. 6*
INVENTOR
Claude ARCHAMBAULT
BY
ATTORNEYS

United States Patent Office 2,813,459
Patented Nov. 19, 1957

2,813,459

SPECTACLES WITH VARIABLE LIGHT TRANSMISSION

Claude Archambault, Montreal, Quebec, Canada

Application April 7, 1954, Serial No. 421,570

1 Claim. (Cl. 88—41)

The present invention relates to spectacles and more particularly to spectacles provided with means to vary the light transmission therethrough.

The general object of the present invention is the provision of spectacles embodying two pairs of polarized lenses and provided with means to enable simultaneous rotation of one pair of polarized lenses in relation to the other pair of polarized lenses in order to vary the degree of light transmission of the spectacles to suit the wearer in accordance with prevailing light intensity.

An important object of the present invention is the provision of spectacles of the character described which are light weight and simple in construction and which have the appearance of ordinary spectacles.

Still another important object of the present invention is the provision in spectacles of the character described, of means to insure the simultaneous and equal rotation of the second pair of polarized lenses with respect to the first pair so as to obtain equal light transmission for the wearer's eyes which is equal whatever the angular position of the second pair of polarized lenses.

Yet another important object of the present invention is the provision of a unitary sub frame arrangement mounting the second pair of polarized lenses, which may be secured to a conventional spectacle frame.

Still another important object of the present invention is the provision of spectacles of the character described in which the means to rotate the second pair of polarized lenses with respect to the first pair is easily accessible to the wearer and is easily actuated.

The foregoing and other important objects of the present invention will become more apparent during the following disclosure and by referring to the drawings in which:

Figure 1 is a front perspective view of the spectacles according to the invention;

Figure 2 is a rear perspective view of the same;

Figure 3 is a perspective view of the sub frame;

Figure 4 is a perspective view of the second pair of polarized lenses as assembled to be inserted into the sub frame shown in Figure 3;

Figures 5 and 6 show the two extreme angular positions of the second pair of polarized lenses; and Figure 7 is a cross-section taken through the assembled spectacles.

Referring now more particularly to the drawings in which like reference characters indicate like elements throughout, the reference numeral 1 indicates a conventional spectacle frame preferably made of plastic material and having the conventional arms 2 which are partly shown and which are pivoted at 3 to the frame 1, as shown in Figure 2. The eye apertures 4' in which the first pair of polarized lenses 4 are fixedly mounted may have any shape and are not necessarily circular. A sub frame, generally indicated at 5, is adapted to be secured to the inside face of the main frame 1. Said sub frame 5 comprises a channel shaped bridge portion 6 interconnecting two annular portions 7 of L-shaped cross-section. One of the annular portions 7 is provided with a notch 8 extending along part of its periphery. Each annular portion 7 is provided with a tab 9 for securing the sub frame 5 to the inside face of the main frame 1 by means of pins 10 as shown in Figure 2. The sub frame is secured to the spectacle frame 1 in such a manner that the inwardly extending flanges of the annular portions 7 will be spaced from the inside face of the main frame 1 so as to define therewith retaining pockets for receiving the assembly of the second pair of polarized lenses, shown generally at 11 in Figure 4. Said assembly consists in a pair of rings 12 in which are mounted the circular polarized lenses 13. The rings 12 are interconnected by a flexible metal strip 14 which is secured at both ends to the respective rings 12 by means of pins 15. The metallic strip 14 is adapted to contact substantially half the outside periphery of the rings 12 which are for this purpose provided with cylindrical face 16 having a smaller diameter than the remaining portion 17 of the outer periphery of the annular rings 12 so that the outer face of strip 14 will be flush with the outer face of portion 17.

One of the rings 12 is provided with an outwardly projecting finger 18 adjacent the attachment of the metal strip 14 to said ring 12. The assembly 11 of the second pair of polarized lenses is mounted within the sub frame 5 so that the metal strip 14 engages the bridge portion 6 of the sub frame 5 and that the two rings 12 engage the corresponding annular portions 7. The tab 18 will be adapted to project through the notch 8 of an annular portion 7 of the sub frame 5. Once the lens assembly 11 is lodged within the sub frame 5, the latter is secured to the main spectacle frame 1 in the manner previously described.

By actuating the finger 18 the second pair of polarized lens 13 will be rotated in unison and at equal angle in relation to the first pair of polarized lenses 4 so as to change the angle between the planes of polarization of said two pairs of lenses. Thus variable light transmission through the spectacle will be obtained.

It will be noted that only a 90° angle of rotation is necessary to produce variation between maximum and minimum light transmission. The flexible connector or strip 14 may have a small cross-section because it is guided throughout its length by the guiding conduit formed by the bridge portions 6 and 19 of the frames 5 and 1 respectively.

The assembled spectacles will weigh only slightly more than conventional spectacles and will have a relatively small overall thickness.

Although the second pair of lenses 13 have to be circular to permit their proper rotation, the main spectacle frame 1 can have any shape desired because the sub frame 5 does not show at the front face of the main frame 1.

In order to insure that equal light transmission is effected, it is necessary to orientate the polarized lenses 4 and 13 during the manufacture of the spectacles according to the invention, in such a manner as to obtain equal angles between the planes of polarization of said lenses for each aperture of the spectacles.

While a preferred embodiment according to the present invention has been illustrated and described it is understood that various modifications may be resorted to without departing from the spirit and scope of the appended claim.

I claim:

Spectacles with variable light transmission comprising a main spectacle frame having eye apertures, a pair of light polarizing lenses fixedly mounted in said apertures, a sub frame secured to said main frame and defining therewith a pair of lense-receiving circular pockets registering with said eye apertures, said sub frame having a hollow bridge portion connecting said pockets, a pair of circular ring members rotatively mounted within said pockets, a flexible metal strip secured at both ends to the periphery of said rotatable ring members and passing through said hollow bridge portion to be guided thereby, said flexible strip being trained over part of the periphery of said rings, a second pair of light polarizing lenses fixedly mounted within said ring members, an actuating finger secured to one of said rings and a notch extending along part of the periphery of an annular portion of said sub frame, said finger extending through said notch.

References Cited in the file of this patent

UNITED STATES PATENTS

| | | |
|---|---|---|
| 2,251,330 | Fairbank | Aug. 5, 1941 |
| 2,377,313 | Casier | June 5, 1945 |
| 2,408,772 | Glasser | Oct. 8, 1946 |
| 2,586,546 | Longenecker | Feb. 16, 1952 |

FOREIGN PATENTS

| | | |
|---|---|---|
| 984,277 | France | Feb. 2, 1951 |
| 682,352 | Great Britain | Nov. 5, 1952 |